No. 881,708. PATENTED MAR. 10, 1908.
R. G. NOYES.
LOGGING SLED.
APPLICATION FILED JUNE 8, 1907.
2 SHEETS—SHEET 1.
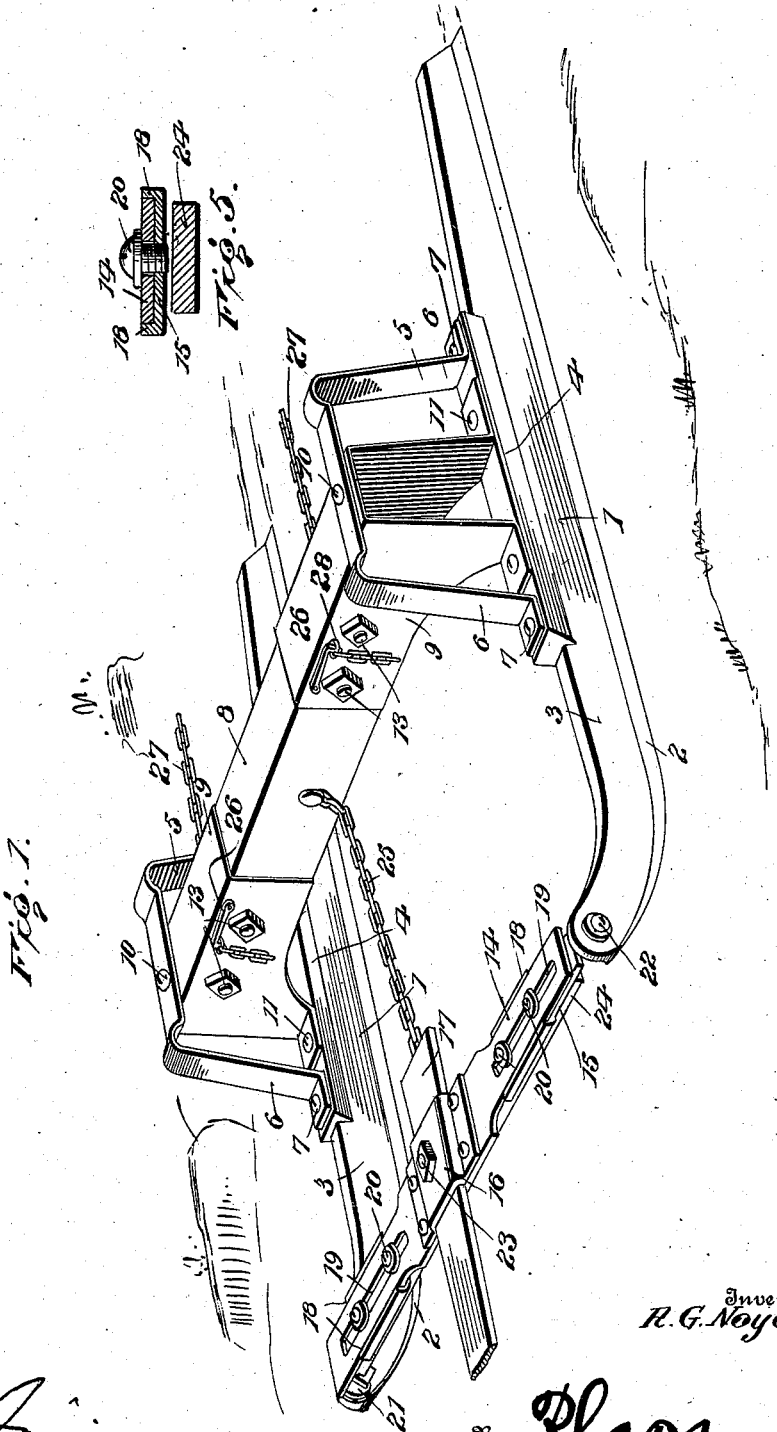

No. 881,708. PATENTED MAR. 10, 1908.
R. G. NOYES.
LOGGING SLED.
APPLICATION FILED JUNE 8, 1907.
2 SHEETS—SHEET 2.
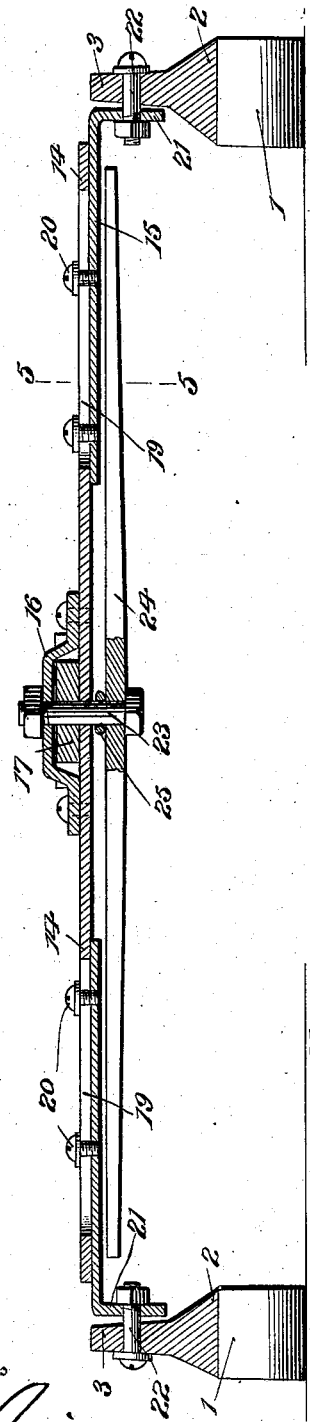
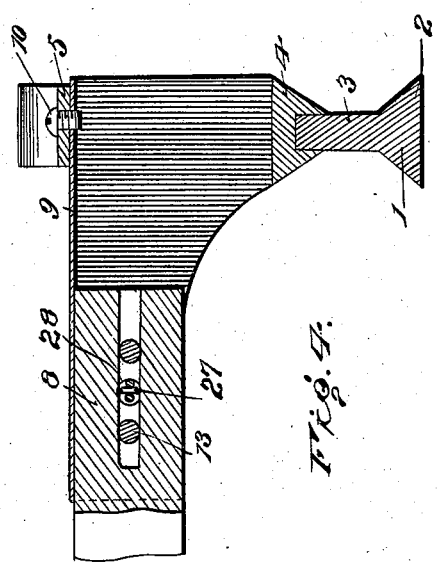
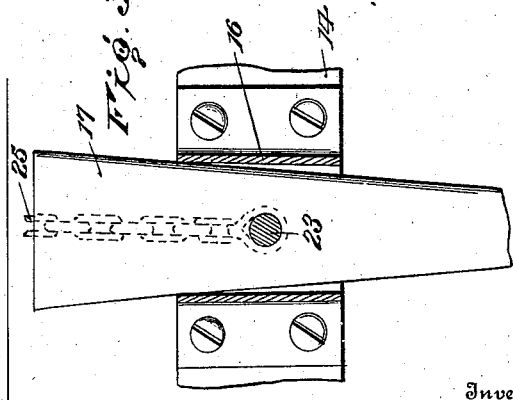
Inventor
R. G. Noyes.

UNITED STATES PATENT OFFICE.

ROSCOE G. NOYES, OF PATTEN, MAINE.

LOGGING-SLED.

No. 881,708.　　　Specification of Letters Patent.　　　Patented March 10, 1908.

Application filed June 8, 1907. Serial No. 377,997.

*To all whom it may concern:*

Be it known that I, ROSCOE G. NOYES, citizen of the United States, residing at Patten, in the county of Penobscot and State of Maine, have invented certain new and useful Improvements in Logging-Sleds, of which the following is a specification.

The present invention relates to certain new and useful improvements in the construction of logging or bob sleds and resides principally in the provision of novel means for adjustably connecting the sled runners whereby the latter can be drawn together or spaced apart in order to accommodate the sled to various roads.

The object of the invention is to provide a simple and inexpensive sled of this character which is so designed as to be constructed entirely of metal and which comprises few and durable parts which can be quickly assembled to produce the finished article.

For a full description of the invention and the merits thereof and also to acquire a knowledge of the details of construction and the means for effecting the result, reference is to be had to the following description and accompanying drawings, in which:

Figure 1 is a perspective view of a logging sled embodying the invention. Fig. 2 is a longitudinal sectional view through the draft member connecting the forward ends of the sled runners. Fig. 3 is a detail view showing the connection between the tongue and the draft member. Fig. 4 is a sectional view through one of the brackets utilized in connecting the cross bar to the sled runner. Fig. 5 is a transverse sectional view through the draft member on the line 5—5 of Fig. 2.

Corresponding and like parts are referred to in the following description and indicated in all the views of the drawings by the same reference characters.

Referring to the drawings the numerals 1 designate the sled runners each of which comprises the basal flanges 2 and an upright rib 3, the forward portions of the runners being bent upwardly in the usual manner. Mounted upon each of the runners 1 at an intermediate point is a block 4, and each of the blocks carries a strap bracket 5 comprising a cross bar or horizontal portion having its intermediate portion bent downwardly, and limbs 6 having the lower extremities thereof extended outwardly and secured to the block by any suitable means such as the screws 7. A cross bar 8 adjustably connects the two runners 1 and the two ends of the cross bar are received within socket members 9. The outer end of each of the socket members 9 has the upper portion thereof connected by means of a screw or similar fastening member 10 to the horizontal portion of the corresponding strap bracket 5, while the lower portion is provided with the arms 11 having the extremities thereof bent outwardly and secured to the block 4 between the limbs 6 of the strap bracket 5. It will thus be apparent that the outer end portions of the socket members 9 are received by the corresponding strap brackets 5 and that the latter serve as a reinforcing means for the former. In connecting the cross bar 8 to the socket members 9 it will be observed that the said cross bar is formed toward its opposite ends with longitudinal slots 12 receiving bolts 13 connecting opposite sides of the socket members. With this construction it will be readily apparent that by loosening the bolts 13 the shanks thereof will be permitted to move freely within the slots 12 and the runners 1 can be drawn together or spaced apart as may be required.

The upturned forward ends of the runners 1 are connected by a longitudinally adjustable draft member comprising the draft bar 14 having the end portions thereof adjustably connected to plates 15 which are pivoted to the runners 1. The central portion of the draft bar 14 carries upon its upper face a socket 16 receiving the rear end of the tongue 17, the opposite end portions of the said bar being reduced in width and received between side flanges 18 upon the plates 15. A longitudinal slot 19 is formed in each end of the bar 14, the said slots receiving clamping screws 20 entering the plates 15 and serving to adjustably connect the draft bar to the said plates. It will be observed that the outer end of each of the plates 15 carries a downwardly extended arm 21 provided with an opening receiving the bolt 22 constituting the pivot pin upon which the draft member is mounted.

Attention is directed to the fact that the tongue receiving socket 16 is diverged rearwardly and that the rear end of the tongue 17 is flared outwardly and is wedged securely within the socket when a forward pull is exerted thereon. A bolt or similar fastening member 23 passes through the socket 16 and the tongue 17 and projects below the draft member where it forms a pivot upon which the whiffle tree 24 is mounted. If found desirable a cable or draft chain 25 may be utilized for connecting the bolt 23 and the cross bar 8, the said chains serving to transmit a portion of the forward pull upon the tongue directly to the said cross bar.

From the foregoing description it will be readily apparent that by loosening the clamping screws 20 and the bolts 13 the runners 1 can be adjusted laterally and set at any distance apart as may be required by the nature of the road upon which it is desired to utilize the sled.

In the preferred form of the invention the chains 27 connecting the rear sled and the forward sled extend through openings 28 in the socket pieces 9 and are engaged by hook members 26 mounted upon the forward pieces of the socket members. These hooks are designed to engage any one of the various links of the two chains and the distance between the sleds can thereby be conveniently regulated.

Having thus described the invention, what is claimed as new is:

1. In a sled, the combination of a pair of runners, socket members carried by the runners, a cross bar having the ends thereof adjustably received by the socket members, and a longitudinally adjustable draft member connecting the runners.

2. In a sled, the combination of a pair of runners, a bracket carried by each of the runners, a socket member also carried by each of the runners and reinforced by the before mentioned bracket, a cross bar having the ends thereof adjustably connected to the socket members, and a longitudinally adjustable draft member connecting the runners.

3. In a sled, the combination of a pair of runners, a block mounted upon each runner, a bracket secured to each block, a socket member mounted upon each block and reinforced by the bracket, a cross bar having the ends thereof adjustably connected to the socket members, and a longitudinally adjustable draft member connecting the runners.

4. In a sled, the combination of a pair of runners, means adjustably connecting the runners, a draft bar, plates slidably connected to the end portions of the draft bar and loosely connected to the runners, and draft means applied to the draft bar.

5. In a sled, the combination of a pair of runners, means adjustably connecting the runners, a draft bar, plates applied to the end portions of the draft bar and provided with flanges embracing the same, the said plates being loosely connected to the sled runners, and a pin and slot connection between the plates and the draft bar.

6. In a sled, the combination of a pair of runners, means adjustably connecting the runners, a draft bar provided at an intermediate point with a socket, a plate applied to each end of the draft bar and loosely connected to the corresponding runner, each of said plates being provided with flanges receiving the draft bar, a pin and slot connection between each of the plates and the draft bar, and a tongue received within the before mentioned socket.

7. In a sled, the combination of a pair of runners, a socket member carried by each of the runners, a cross bar connecting the runners and having the end portions thereof adjustably received by the socket members, a draft bar, a tongue applied to the draft bar, and a plate slidably connected to each end of the draft bar and loosely connected to the corresponding runner.

In testimony whereof I affix my signature in presence of two witnesses.

ROSCOE G. NOYES. [L. S.]

Witnesses:
F. J. COBURN,
S. T. SEWALL.